United States Patent [19]

Haines et al.

[11] 3,859,867

[45] Jan. 14, 1975

[54] BICYCLE PEDAL ATTACHMENT

[76] Inventors: Virginia E. Haines, 6103 Harwood, Des Moines, Iowa 30312; William F. Albright, 1616 Bell Ave., S.W., Des Moines, Iowa 40315

[22] Filed: Feb. 26, 1973

[21] Appl. No.: 335,921

[52] U.S. Cl. ................................................. 74/563
[51] Int. Cl. ............................................. G05g 1/16
[58] Field of Search ................ 74/563, 594.6, 594.4

[56] References Cited
UNITED STATES PATENTS

| | | |
|---|---|---|
| 347,977 | 8/1886 | Strickland ........................ 74/594.4 |
| 362,407 | 5/1887 | Warwick ........................ 74/594.4 X |
| 597,830 | 1/1898 | Herrick .............................. 74/594.6 |
| 2,548,988 | 4/1951 | McDonald ......................... 74/594.4 |
| 2,568,443 | 9/1951 | Gerner et al. ..................... 74/594.4 |
| 2,751,797 | 6/1956 | Pearl .................................. 74/594.4 |

*Primary Examiner*—Samuel Scott
*Assistant Examiner*—F. D. Shoemaker
*Attorney, Agent, or Firm*—Henderson & Strom

[57] ABSTRACT

This invention relates to an apparatus for attachment to a bicycle pedal wherein a sleeve means is removeably adapted to temporarily enclose the bicycle pedal to aid in protecting the feet of the user.

4 Claims, 6 Drawing Figures

PATENTED JAN 14 1975  3,859,867

BICYCLE PEDAL ATTACHMENT

BACKGROUND OF THE INVENTION

Contemporary bicycles, and more particularly the variety known as the "English racing bicycle", have become increasingly popular the last several years. Many of these bicycles, and especially the 5, 10, and 15-speed English varieties used for long distance riding, have abandoned the old type pedal containing elongated rubber blocks in favor of a new all-metal pedal. Illustrated herein is a common all-metal type known as "rat-trap" pedal.

Many contemporary cyclists prefer to ride barefooted. However, the metal pedals frequently have serrated edges which are hard on bare feet. Furthermore, during warm weather the sun light may heat the pedal to temperatures quite hot. The all-metal pedals being therefore inherently uncomfortable to bare feet, attempts have been made to find satisfactory coverings for these pedals.

Carpet strips have been stapled together, the opposite ends of the carpet unit then being interconnected by an elastic strip, and the whole then being slid over the pedal. This device proved unsatisfactory because the carpet covered only one side of the pedal, and because the stapled strips tended to come apart.

Tape has been wound around the pedals, but the tape cannot be reused, thereby making this method quite costly and unsatisfactory.

SUMMARY OF THE INVENTION

This invention relates to an attachment for bicycle pedals wherein a sleeve means having a continuous flexible wall with a textured internal and external surface is adapted to slide over and enclose a bicycle pedal.

In view of the defects of the prior art, it is an object of this invention to provide a novel apparatus for attachment to bicycle pedals.

It is an object of this invention to provide an attachment which is removable and reusable and therefore economical of use.

It is another object of this invention to provide an attachment which will enclose both sides of a bicycle pedal.

It is a further object of this invention to provide an attachment which will shield and cushion the foot against pedal serrations and insulate the foot against heat.

It is a further object of this invention to provide an attachment with textured surfaces whereby a firm grip may be had upon the pedal.

It is an object of this invention to provide an attachment which is convenient to store when not in use.

It is an object of this invention to provide an attachment which is extremely economical of manufacture, rugged of structure, effective in service, and capable of attaining the objects listed above.

These objects and other features and advantages of this invention will become readily apparent by reference to the following description when taken in conjunction with the accompanying drawings.

BRIEF DESCRIPTION OF THE DRAWINGS

The appended drawings illustrate the invention, wherein.

DESCRIPTION OF THE PREFERRED EMBODIMENT

Figure 1:
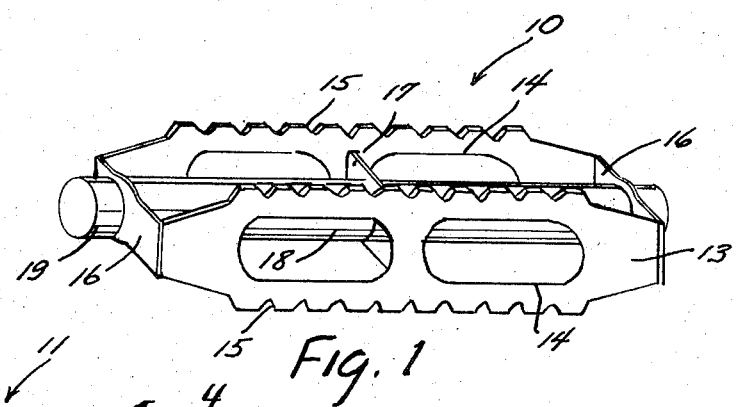
FIG. 1 is a perspective view of a conventional bicycle pedal of the "rat-trap" variety.
Figures 2, 6:
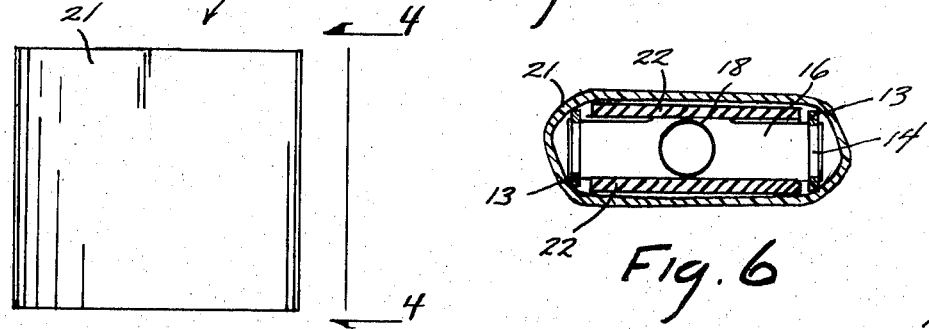
FIG. 2 is a plan view of the invention.
FIG. 6 is a transverse cross section through the assembly of FIG. 5, illustrating a modification of the invention.
Figure 5:
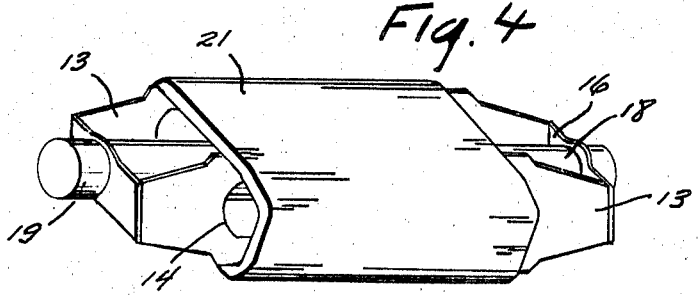
FIG. 5 is a perspective view depicting the invention in use.

Referring now to the drawings, a conventional pedal of the type known as "rat-trap" is depicted generally at 10 (FIGS. 1 and 5), and the preferred embodiment of the invention is indicated generally at 11 (FIGS. 2 and 5).

The pedal 10 (FIG. 1) includes two metal side blanks 13 containing holes 14 to give light weight and serrated edges 15 to give the foot better traction. The side blanks 13 are disposed parallel to each other and perpendicular to end blanks 16. A pair of end blanks 16, with a central support blank 17 located midway between, are perpendicularly transfixed by a central member 18. The side blanks 13 are disposed parallel to, and at uniform distances on opposite sides of the central cylinder 18. The side blanks 13 are held in this position by perpendicular attachment to the end blanks 16 and central support blank 17. The pedal 10 is connected to the bicycle by means of a member 19 which is normally externally threaded (not shown).

The preferred embodiment indicated at 11 in FIG. 2 comprises simply a flexible sleeve 21. The material used may be similar to that found in what is commonly termed a PVC hose, although this invention is not limited to that particular polyvinyl chloride material. Nor is the invention limited to the particular cross-sectional shape depicted in FIG. 3, as the wall is flexible and can assume other shapes within the limitation of its continuous nature. Although not shown by the drawings, the PVC sleeve 21 usually has textured internal and external surfaces, and with rounded protuberances formed thereby. The particular embodiment 21 depicted herein has an inner diameter of approximately 2.5 inches and a thickness of approximately .10 inch, but these dimensions are not critical.

Figure 3:
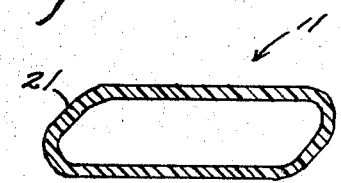
FIG. 3 is a sectional view of the preferred embodiment of the invention.
Figure 4:
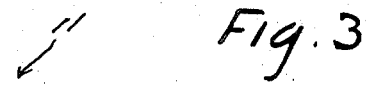
FIG. 4 is a side elevational view of the invention.

FIG. 5 depicts the invention 11 in use snugly embracing a pedal 10 sufficiently such that when not in use the sleeve 21 is frictionally held in place by the serrations 15. When used, the sleeve wall 21 is flexed to a proper configuration somewhat as shown in FIG. 3 whereby it can be slid over the pedal 10 desired to be covered. As noted in FIG. 5, the pedal serrations 15 are completely covered, and in effect aid to hold the sleeve 21 in place. It can readily be appreciated that in use the bare foot of the user will be pressed against the sleeve 21. And as important, the flexibility of the sleeve 21 enables the foot to "feel" the pedal due to the sleeve 21 molding and conforming to the configuration of the pedal 10. Thus, the joy and freedom of cycling barefoot is retained on the high speed bike, with the added satisfaction of having complete control over the serrated pedal action via the flexible sleeve 21.

A modification of the preferred embodiment is depicted in FIG. 6. A pair of pads 22 are placed on opposite sides of the pedal 10, each pad 22 held against the central support blank 17 and central cylinder 18 between the end blanks 16. The pads 22 are rectangular slabs of material such as neoprene, and, when used, are placed upon the pedal before the sleeve 21 is slid over the pedal 10. The pads 22 function as an extra cushion between the foot and the pedal 10.

In use of either embodiment of FIGS. 1-5 and 6, it should be noted that the sleeve 21, or the sleeve 21 and pads 22, may be readily and easily added to or removed from the pedal 10 by any person, adult or child, old enough to maneuver a two-wheel bicycle. The invention may be used over and over again, and is very handy for storage between uses.

Although a preferred embodiment and a modification have been disclosed herein, it is to be remembered that various modifications and alternate constructions can be made thereto without departing from the full scope of the invention, as defined in the appended claims.

We claim:

1. A bicycle pedal device comprising:

a bicycle pedal having a central member adapted to be affixed to a pedal crank, said pedal having elongated, transversely opposed, parallel side walls affixed to and on opposite sides of the central member, the outer exposed edges of said side walls having serrations thereon;

sleeve means formed by a continuous wall of flexible material for surrounding said pedal in an unstretched condition of said sleeve means;

means for holding said sleeve means on said pedal comprising frictional abutment of portions of an inner part of said flexible wall of said sleeve means in contact with said serrations of said pedal side walls; and means for preventing said sleeve means from rotating on said pedal wherein said sleeve means is of substantially a parallelogram shape with rounded corners, as viewed from an end view of an open end of said sleeve means.

2. A bicycle pedal attachment as defined in claim 1 wherein said wall includes uniformly textured internal and external surfaces.

3. A bicycle pedal attachment as defined in claim 2 wherein said surfaces include rounded protuberances.

4. A bicycle pedal attachment as defined in claim 1 wherein said sleeve means includes a pair of pads, each pad held by said wall on an opposite side of the pedal, said pads being of a resilient material.

* * * * *